United States Patent [19]

Bojas et al.

[11] Patent Number: 5,044,477
[45] Date of Patent: Sep. 3, 1991

[54] TORQUE CONVERTER VISCOUS COUPLING BYPASS ELEMENT WITH IMPROVED SEAL ARRANGEMENT

[75] Inventors: Edward J. Bojas, Marshall; Lester R. Campbell, Jr.; Lawrence H. Williams, Jr., both of Battle Creek; Charles A. Mains, Marshall, all of Mich.

[73] Assignee: Eaton Corporation, Cleveland, Ohio

[21] Appl. No.: 584,962

[22] Filed: Sep. 19, 1990

[51] Int. Cl.$^5$ .................................. F16D 33/00
[52] U.S. Cl. ......................... 192/3.29; 192/3.31; 192/3.33; 192/58 B; 192/48.3; 192/106.2
[58] Field of Search .................. 192/3.29, 3.28, 3.31, 192/3.32, 3.33, 58 B, 48.3, 106.2

[56] References Cited

U.S. PATENT DOCUMENTS

| | | | |
|---|---|---|---|
| 4,317,510 | 3/1982 | Staub, Jr. | 192/48.3 |
| 4,423,803 | 1/1984 | Malloy | 192/3.29 |
| 4,462,492 | 7/1984 | Mueller | 192/3.29 |
| 4,466,518 | 8/1984 | Mueller | 192/3.29 |
| 4,473,145 | 9/1984 | Bopp | 192/3.29 |
| 4,493,406 | 1/1985 | Bopp | 192/3.28 X |
| 4,496,034 | 1/1985 | Bopp | 192/3.28 |
| 4,505,365 | 3/1985 | Bopp | 192/3.29 |
| 4,540,076 | 9/1985 | Bopp | 192/48.3 X |

Primary Examiner—Allan D. Herrmann
Assistant Examiner—Andrea Pitts
Attorney, Agent, or Firm—L. J. Kasper

[57] ABSTRACT

A bypass element (27) for a torque converter (15) is provided in which the bypass element comprises a viscous coupling (29). The viscous coupling includes a housing assembly comprising a body member (35) and a cover member (37), defining a viscous chamber (39) therebetween. Disposed within the viscous chamber is a clutch assembly (41) including a clutch portion (61) and a hub portion (65). The body member includes a hub portion (47) on which are disposed bushings (85 and 87). The cover member includes a hub portion (59) on which is disposed a bushing (89). The hub portion defines annular seal chambers (101 and 103) which include O-ring seals (105 and 107) respectively. Disposed upstream of the upstream O-ring, the hub portion defines an annular leakage groove (113) and an axial passage (115), communicating from the leakage groove to a downstream chamber (109) adjacent the coupling. High pressure in an upstream chamber (111), which would act against the upstream O-ring, is relieved by the leakage groove and axial passage, and the resulting flow of automatic transmission fluid through the hub portion also serves to cool the viscous coupling.

8 Claims, 3 Drawing Sheets

TORQUE CONVERTER VISCOUS COUPLING BYPASS ELEMENT WITH IMPROVED SEAL ARRANGEMENT

BACKGROUND OF THE DISCLOSURE

The present invention relates to viscous couplings, and more particularly, to such couplings employed in automatic transmission torque converters, to serve as bypass elements to bypass the torque converter.

Torque converter type automatic transmissions have achieved widespread application and acceptance in motor vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to bypass the torque converter with some type of direct drive, which typically is activated when the vehicle is operating in the higher gear ratios, and above a predetermined vehicle speed.

While these prior art direct drive bypass arrangements have resulted in improvements in fuel economy, certain types of bypass element have, under certain operating conditions, transmitted various drive line vibrations to the passenger compartment of the motor vehicle, causing degradation of the ride quality of the vehicle.

In an effort to provide a bypass element which would not transmit drive line vibration to the passenger compartment, those skilled in the art have utilized a viscous coupling as the bypass element. Although the use of a viscous coupling as the bypass element does serve to minimize transmission of drive line vibrations to the passenger compartment, it is important that the coupling be designed for maximum efficiency and maximum durability.

One of the concerns associated with the use of a viscous coupling as a bypass element in a torque converter of an automatic transmission is the possibility of the automatic transmission fluid leaking into the viscous fluid in the viscous coupling, or visa versa. The result has been that the viscous couplings utilized commercially have included extremely complex and expensive sealing arrangements. The sealing arrangement which has been in use commercially by the assignee of the present invention is illustrated in U.S. Pat. No. 4,462,492, assigned to the assignee of the present invention and incorporated herein by reference. The prior art sealing arrangement has included double-lip seals which are expensive, and the associated structure on which the seals are seated results in complex and expensive machining operations.

SUMMARY OF THE INVENTION

According, it is an object of the present invention to provide a viscous coupling for use as the bypass element of a torque converter automatic transmission, wherein the viscous coupling is less expensive and complicated, but still provides sufficient sealing capability, to seal the automatic transmission fluid from the viscous fluid.

The above and other objects of the invention are accomplished by the provision of an improved viscous coupling for use as a bypass element in a torque converter assembly including a torque converter housing and an output shaft. The viscous coupling is of the type including an annular housing assembly adapted to be positioned within the torque converter housing and having axially-spaced, radially-extending annular sidewall (body and cover) members defining an annular viscous chamber therebetween adapted to contain viscous fluid. The annular housing assembly defines a radially-extending, annular clutching surface adapted for clutching coaction with a confronting surface of the torque converter housing. An annular clutch assembly is disposed within the viscous chamber and includes an annular, radially-extending clutch portion adapted for viscous clutching coaction with one of the sidewall members, and an axially-extending hub portion adapted to be drivingly associated with the output shaft of the torque converter assembly. The sidewall members define annular, axially-extending hub portions defined at a radially inner extent of the sidewall members, the sidewall hub portions having inner peripheral surfaces journaled on outer peripheral surfaces of the clutch hub portion. The viscous coupling cooperates with the torque converter housing to define an upstream, high pressure chamber with regard to the flow of fluid within the torque converter assembly.

The improved viscous coupling is characterized by the inner peripheral surfaces of the sidewall hub portions and the outer peripheral surfaces of the clutch hub portion cooperating to define a pair of seal chambers. Sealing members are disposed in the sealing chambers, the sealing members comprising substantially the only fluid seal between the upstream chamber of the torque converter assembly and the annular viscous chamber of the viscous coupling, along the clutch hub portion.

DESCRIPTION OF PREFERRED EMBODIMENT

Figure 1:
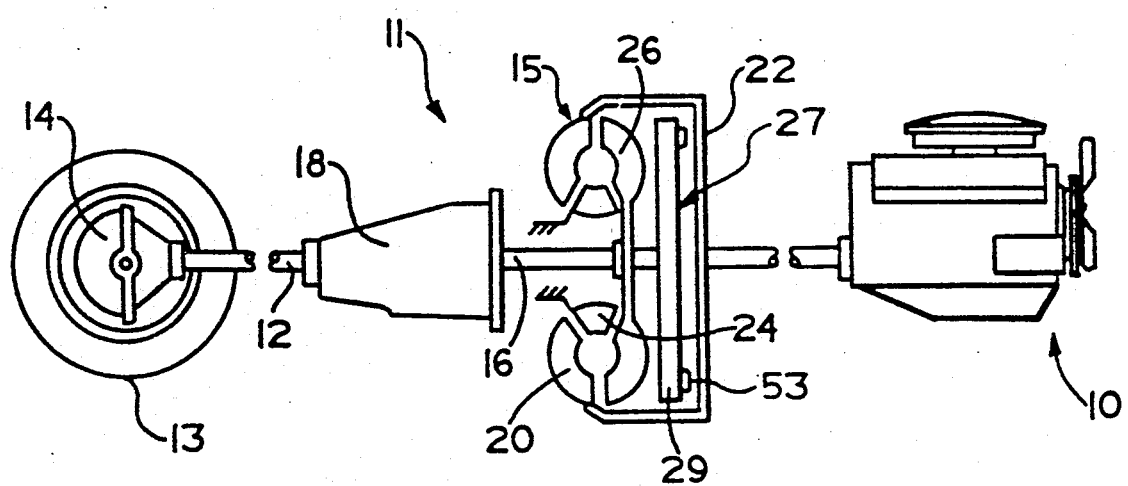
FIG. 1 is a schematic view of a motor vehicle drive train including an automatic transmission of the torque converter type, employing a torque converter bypass element made in accordance with the present invention.

The motor vehicle drive train shown schematically in FIG. 1 includes an internal combustion engine 10, an automatic transmission 11, and a propeller shaft 12 driving wheels (front or rear) 13 through a differential 14. The automatic transmission 11 includes a torque converter 15 having an output shaft 16 and a gear ratio box 18, the box 18 being driven by the torque converter output shaft 16. The torque converter 15 is filled with automatic transmission fluid ("ATF") and includes, in a manner well-known in the art, a pump element 20 driven by the engine 10 through a torque converter housing 22. The torque converter 15 also includes a stator 24, and a turbine 26 which is driven hydrokinetically by the pump 20.

The torque converter 15 further includes a bypass element, generally designated 27, the bypass element 27 being effective, when actuated, to provide a direct drive from the torque converter housing 22 to the torque converter output shaft 16 through a viscous coupling 29, thus bypassing the high slippage drive path through the pump 20 and turbine 26.

Figure 2:
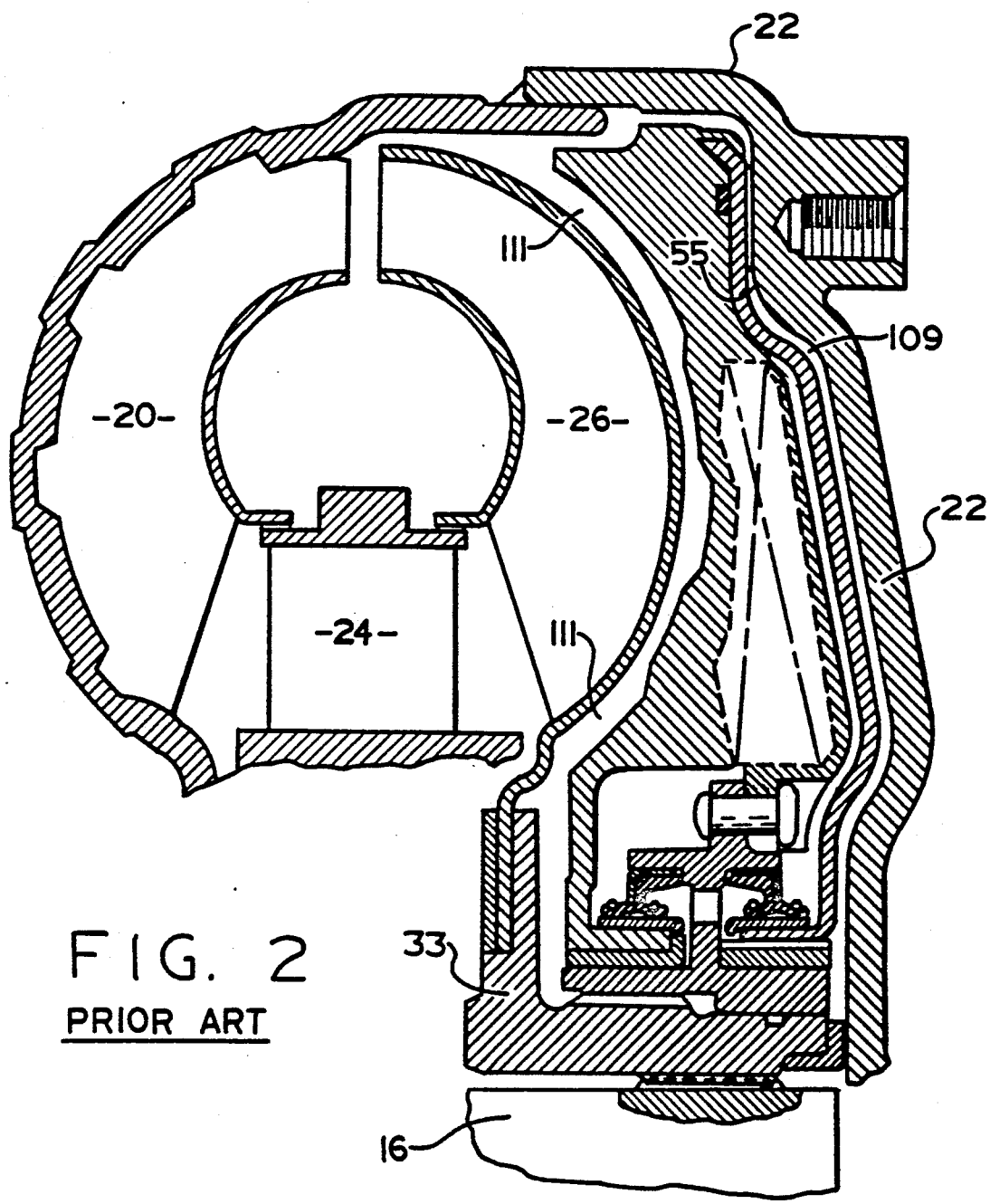
FIG. 2 is a fragmentary, axial cross-section of a torque converter assembly of the type shown schematically in FIG. 1, including a prior art viscous coupling bypass element.

Referring now primarily now to FIG. 2, the turbine 26 is secured by any suitable means to an annular mounting member 33. A detailed explanation of the construction of the mounting member 33 is included in U.S. Pat. No. 4,496,034, assigned to the assignee of the present invention, and incorporated herein by reference. It is sufficient for purposes of the present invention to note that rotation of the turbine 26 causes rotation of the mounting member 33, and rotation of the torque converter output shaft 16, which is splined to the mounting member 33.

Referring still primarily to FIG. 2, the viscous coupling of the type to which the present invention relates is generally annular, and generally planar, and is of a "sandwich" construction. The viscous coupling includes an annular housing assembly, adapted to be positioned within the torque converter housing 22, and having axially-spaced, annular sidewall members defining an annular clutch chamber therebetween, with an annular clutch assembly being disposed within the clutch chamber.

Figure 3:
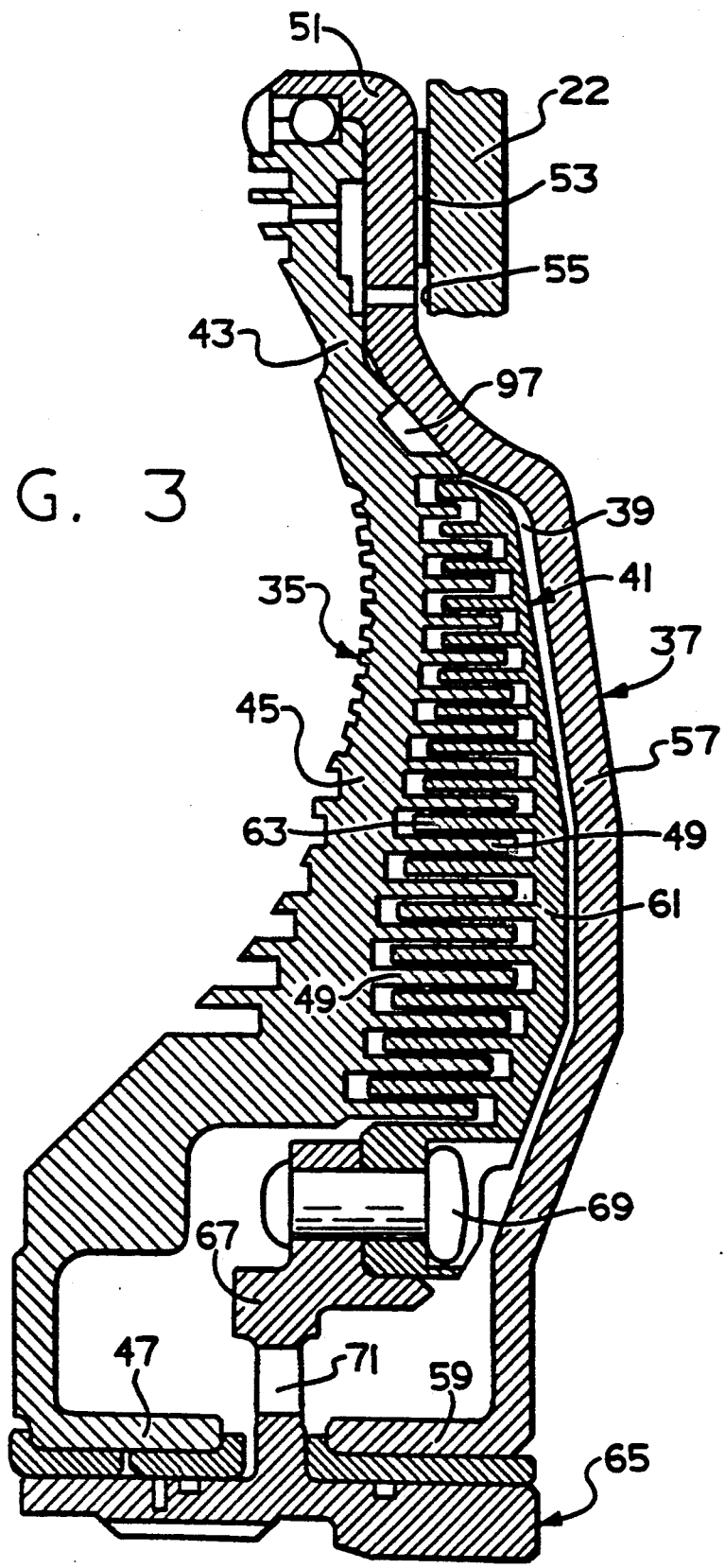
FIG. 3 is an enlarged, axial cross-section, similar to FIG. 2, illustrating a viscous coupling bypass element made in accordance with the present invention.

Referring now primarily to FIG. 3, the viscous coupling 29 of the present invention will be described in detail. One sidewall of the annular housing is constituted by a body member 35, and the other sidewall of the annular housing is constituted by a cover member 37. The body member 35 and cover member 37 cooperate to define an annular viscous clutch chamber 39. A clutch assembly, generally designated 41, is disposed within the clutch chamber 39. The cover member 37 is preferably formed as a steel stamping, while the body member 35 and clutch assembly 41 are preferably formed as permanent mold aluminum castings.

The body 35 includes a radially outer peripheral portion 43, an intermediate sidewall portion 45, and an inner portion terminating in an axially-extending hub portion 47. Intermediate side wall portion 45 is machined on its inner face to form a series of annular lands 49, which define therebetween a series of annular grooves.

The cover member 37 includes a radially outer peripheral portion 51, which may be rolled over the peripheral portion 43 of the body member 35, or attached thereto by any other suitable means. An annular clutch lining 53 is adhesively secured to a forward surface of the cover member 37 for clutching coaction with a confronting inner surface 55 of the torque converter housing 22. The cover member 37 further includes an intermediate sidewall portion 57, and a radially inner portion terminating in an axially-extending hub portion 59.

The clutch assembly 41 includes a clutch portion 61 which is machined to form a series of annular lands 63 separated by a series of annular grooves. The annular lands 49 of the body member 35 and the annular lands 63 of the clutch portion 61 are interdigitated to define therebetween a serpentine-shaped viscous shear space adapted to transmit torque from the body member 35 to the clutch assembly 41 in response to the presence of viscous fluid in the shear space.

The clutch assembly 41 further includes an annular, axially-extending hub portion 65, including a radially-extending mounting portion 67 which is secured by a plurality of rivets 69 to the clutch portion 61. The mounting portion 67 defines a plurality of fluid openings 71, the function of which is to permit the circulation of viscous fluid, within the coupling 29, between the shear space and the area between the clutch portion 61 and the cover member 37.

Figure 4:
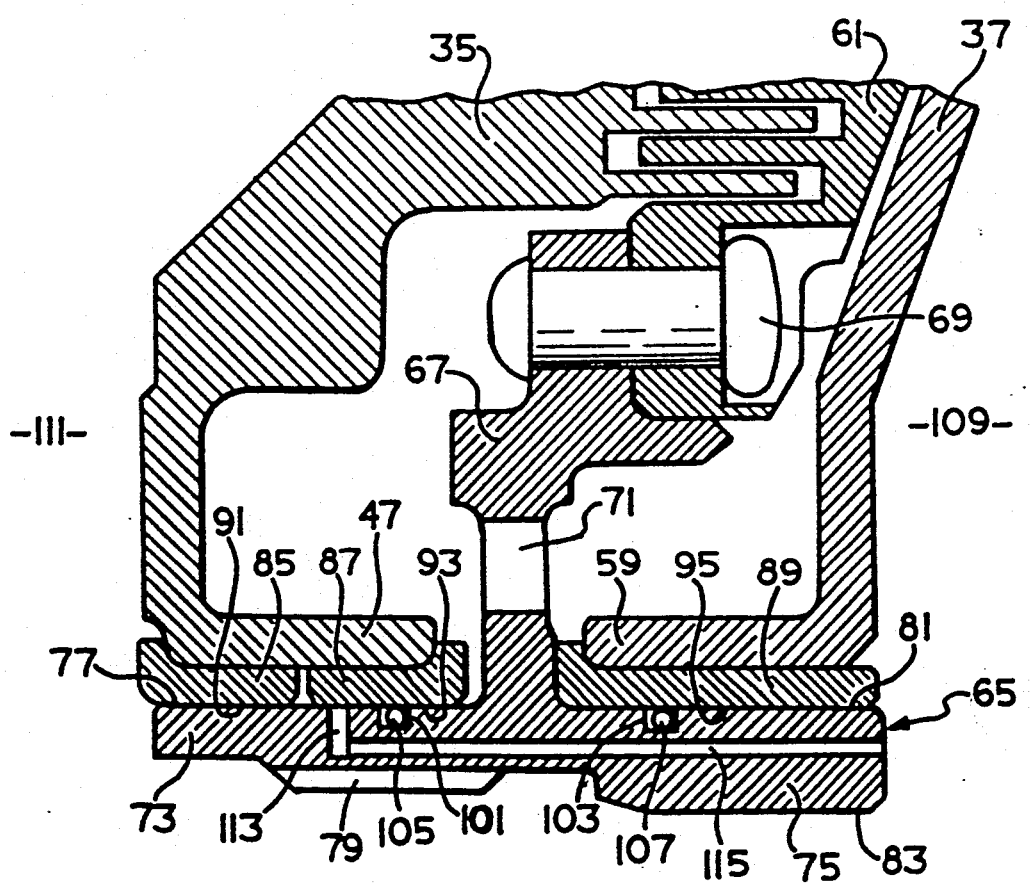
FIG. 4 is a further enlarged, fragmentary, axial cross-section illustrating the hub portion of the viscous coupling bypass element of FIG. 3.

Referring now primarily now to FIG. 4, the clutch hub portion 65 includes a relatively thin, upstream annular portion 73, and a relatively thick, downstream annular portion 75. The upstream portion 73 defines an annular outer peripheral surface 77, and a set of internal splines 79, in splined engagement with a set of mating, external splines defined by the annular mounting member 33 of the torque converter turbine 26. The relatively thick, downstream portion 75 defines an outer peripheral surface 81 and an inner peripheral surface 83 disposed to be in engagement with an adjacent peripheral surface of the annular mounting member 33.

The hub portion 47 of the body member 35 has a pair of annular bushings 85 and 87 pressed onto the hub portion 47, the bushings 85 and 87 preferably being formed of bronze or another suitable material. Similarly, the hub portion 59 of the cover member 37 has an annular bushing 89 pressed on to the hub portion 59, the bushing 89 preferably being formed of the same material as the bushings 85 and 87. The bushings 85, 87 and 89 define inner peripheral surfaces 91, 93 and 95, respectively, and because the bushings are non-rotatable relative to the hub portions 47 and 59, it will be understood that subsequent references to inner peripheral surfaces defined by the body and cover sidewall members 35 and 37 are actually referring to the inner peripheral surfaces 91, 93, and 95 of the bushings 85, 87, and 89, respectively.

In order to permit relative rotation between the assembly of the body member 35 and cover member 37, and the clutch assembly 41, the inner peripheral surfaces 91 and 93 cooperate with the outer peripheral surface 77 to define a running clearance therebetween, and similarly, the inner peripheral surface 95 cooperates with the outer peripheral surface 81 to define a running clearance therebetween. By way of example only, the running clearances defined between the inner peripheral surfaces 91, 93, 95 and the outer peripheral surfaces 77 and 81 are typically in the range of about 0.002 to about 0.0025 inches.

The viscous clutch chamber 39 is filled with a suitable viscous fluid, such as a viscous silicone fluid, one specific example of which would be dimethyl polysiloxane. The viscous fluid is prevented from escaping radially outwardly by an elastomeric square cut seal ring 97 (see FIG. 3) received in a groove defined by the peripheral portion 43 of the body member 35. The viscous fluid is prevented from escaping at the radially inner periphery of the viscous coupling 29 by a novel arrangement of O-ring seals. In the prior art device, as illustrated in above-incorporated U.S. Pat. No. 4,496,034, and as shown in FIG. 2, such fluid sealing was accomplished by a fairly complex and expensive arrangement of double-lip seals. Such an arrangement also added substantially to the complexity and cost of machining of the body member 35, cover member 37, and clutch assembly 41.

The disadvantages of the prior art sealing arrangement are overcome in the present invention. The upstream annular portion 73 of the clutch hub portion 65 defines an annular seal chamber 101, while the downstream annular portion 75 of the clutch hub portion 65 defines an annular seal chamber 103. Disposed within the seal chamber 101 is an O-ring sealing member 105, and disposed within the seal chamber 103 is an O-ring sealing member 107. The O-ring 105 is disposed in sealing engagement with the inner peripheral surface 93, while the O-ring 107 is disposed in sealing engagement with the inner peripheral surface 95. The use of the O-rings 105 and 107 is acceptable, in part because they are disposed between surfaces which don't experience relative speeds greater than several hundred rpm, and such relative speeds occur only when the coupling 29 is in an engaged position, as will be described subsequently.

It will be readily understood by those skilled in the art that the purpose of the O-rings 105 and 107 is twofold: the first purpose is to prevent leakage of viscous fluid out of the viscous coupling 29; and the second purpose is to prevent the leakage of ATF into the viscous coupling 29. As is also well-known to those skilled in the art, it is especially important to prevent the leakage of ATF into the viscous coupling, partially because the ATF, when mixed with the viscous silicon fluid, would substantially reduce the overall viscosity of the mixture, thus causing a substantial degradation in the torque capacity of the viscous coupling.

In the operation of the torque converter 15, ATF is normally admitted into the torque converter in an annular downstream chamber 109 (see FIGS. 2 and 4) formed between the cover member 37 and the torque converter housing 22. The presence of the fluid in the downstream chamber 109 moves the entire viscous coupling 29 to the left in FIG. 2 to a disengaged position (as illustrated schematically in FIG. 1) wherein the clutch lining 53 is out of engagement with the confronting inner surface 55. The ATF is thus able to flow radially outwardly through the downstream chamber 109, past the clutch lining 53, and into a main, upstream chamber 111 of the torque converter 15.

When it is desired to engage the bypass element 27, for example, when the vehicle is operating in a higher gear ratio and above a predetermined vehicle speed, the direction of flow of the ATF in the torque converter is reversed by actuation of a suitable solenoid valve (not shown). The ATF is now admitted to the upstream chamber 111 of the torque converter where it exerts a biasing force against the body member 35 and moves the viscous coupling to the right in FIG. 2 to bring the clutch lining 53 into frictional engagement with the confronting surface 55. The transmission will now drive directly through the viscous coupling 29 to the output shaft 16, thereby bypassing the torque converter 15. Although there is a limited amount of slip in the viscous coupling occurring between the body member 35 and the clutch assembly 41, such slippage is significantly less than the slippage in the torque converter 15, so that the overall efficiency of the transmission is significantly increased, with corresponding improvements in vehicle fuel economy, whenever the bypass element 27 is in the engaged position (as shown in FIG. 2). Furthermore, the viscous coupling 29 has the effect of eliminating drive line vibrations that are transmitted to the passenger compartment in bypass elements employing a solid mechanical connection between the torque converter housing 22 and the output shaft 16.

When the bypass element 27 is in its engaged condition, the fluid pressure in the upstream chamber 111 is relatively high, such that the chamber 111 may also be referred to as a "high pressure" chamber. When the bypass element 27 is in its disengaged condition, the fluid pressure in the downstream chamber 109 is relatively low, such that the chamber 109 may also be referred to as a "low pressure" chamber. By way of example only, the pressure in the upstream chamber 111 when the bypass element 27 is in its engaged position is typically about 80 to 100 psi, while the pressure in the downstream chamber 109 is basically 0 psi when the bypass element is engaged. Thus, when the bypass element 27 is engaged, it may be seen that the natural tendency for fluid flow will be from the upstream chamber 111 to the downstream chamber 109. One result of this is that fluid pressure will build in the running clearance between the inner peripheral surfaces 91 and 93 and the outer peripheral surface 77 of the clutch hub portion 65.

Therefore, in accordance with another aspect of the present invention, the upstream annular portion 73 of the clutch hub portion 65 defines an annular leakage groove 113, preferably disposed just upstream of the O-ring sealing member 105. The clutch hub portion 65 defines an axial passage 115, which is in open communication between the leakage groove 113 and the downstream chamber 109, and therefore, is operable to relieve fluid pressure which can build up on the upstream side of the O-ring 105. In addition to relieving pressure on the O-ring 105, and groove 113 and passage 115 result in a continuous flow of ATF through the hub portion 65. One beneficial result of such flow is the transfer of heat from the viscous coupling 29 to the ATF flowing from the upstream chamber 111 to the downstream chamber 109. Other cooling flow passages through the coupling may still be required, but the flow through the groove 113 and passage 115 can be sized as appropriate to provide sufficient cooling near the axis of rotation of the coupling.

The invention has been described in great detail in the forgoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A viscous coupling for use as a bypass element in a torque converter assembly including a torque converter housing and an output shaft; said viscous coupling being of the type including an annular housing assembly adapted to be positioned within the torque converter housing and having axially spaced, radially-extending annular side wall members defining an annular viscous chamber therebetween adapted to contain viscous fluid; said annular housing assembly defining a radially-extending annular clutching surface adapted for clutching coaction with a confronting surface of the torque converter housing; an annular clutch assembly disposed within said viscous chamber and including an annular, radially-extending clutch portion adapted for viscous clutching coaction with one of said side wall members, and an axially-extending clutch hub portion adapted to be drivingly associated with the output shaft of the torque converter assembly; said side wall members defining annular, axially-extending hub portions defined at a radially inner extent of said side wall members, said side wall hub portions having inner peripheral surfaces journaled on outer peripheral surfaces of said clutch hub portion; said viscous coupling cooperating with said torque converter housing to define an upstream, high pressure chamber, and a downstream, low pressure chamber with regard to the flow of fluid within the torque converter assembly; characterized by:
  (a) said inner peripheral surfaces of said side wall hub portions and said outer peripheral surfaces of said clutch hub portion cooperating to define a pair of seal chambers; and
  (b) sealing members disposed in said seal chambers, said sealing members comprising substantially the only fluid seal between the upstream chamber of the torque converter assembly and said annular viscous chamber of said viscous coupling, along said clutch hub portion.

2. A viscous coupling as claimed in claim 1 characterized by said outer peripheral surface of said clutch hub portion and said inner peripheral surface of said side wall hub portions cooperating to define a running clearance, disposed on the upstream side of the upstream one of said sealing members.

3. A viscous coupling as claimed in claim 2 characterized by said clutch hub portion defining fluid passage means communicating between said running clearance and said downstream chamber, to relieve fluid pressure from said upstream sealing member.

4. A viscous coupling as claimed in claim 1 characterized by said side wall hub portions including bushing means defining said inner peripheral surfaces journaled on said outer peripheral surfaces of said clutch hub portion.

5. A viscous coupling for use as a bypass element in a torque converter assembly including a torque converter housing and an output shaft; said viscous coupling being of the type including an annular housing assembly adapted to be positioned within the torque converter housing and comprising a radially-extending body member, and an axially-spaced, radially-extending cover member, said body member and said cover member cooperating to define an annular viscous chamber therebetween adapted to contain viscous fluid; said annular housing assembly defining a radially-extending annular clutching surface adapted for clutching coaction with a confronting surface of the torque converter housing; an annular clutch assembly disposed within said viscous chamber and including an annular, radially-extending clutch portion adapted for viscous clutching coaction with said body member, and an axially-extending clutch hub portion adapted to be drivingly associated with the output shaft of the torque converter assembly; said body member and said cover member defining annular, axially-extending hub portions defined at radially inner extents of said members, said hub portions of said body and cover members having inner peripheral surfaces journaled on outer peripheral surfaces of said clutch hub portion; said viscous coupling cooperating with said torque converter housing to define an upstream, high pressure chamber, adjacent said body member and a downstream, low pressure chamber adjacent said cover member; characterized by:
  (a) said inner peripheral surface of said body member hub portion and said outer peripheral surface of said clutch hub portion cooperating to define an upstream seal chamber;
  (b) said inner peripheral surface of said cover member hub portion and said outer peripheral surface of said clutch hub portion cooperating to define a downstream seal chamber; and
  (c) sealing members disposed in said seal chambers, said sealing members comprising substantially the only fluid seal between the upstream chamber and said annular viscous chamber of said viscous coupling, along said body member clutch hub and said cover member clutch hub.

6. A viscous coupling as claimed in claim 5 characterized by said outer peripheral surface of said clutch hub portion and said inner peripheral surface of said body member hub portion cooperating to define a running clearance disposed on the upstream side of said upstream seal chamber.

7. A viscous coupling as claimed in claim 6 characterized by said clutch hub portion defining fluid passage means communicating between said running clearance and said downstream chamber, to relieve fluid pressure from upstream of said upstream seal chamber.

8. A viscous coupling as claimed in claim 6 characterized by said body member and said clutch portion defining a plurality of interdigitated lands and grooves, cooperating to define a viscous shear space therebetween adapted to transmit torque from said body member to said clutch assembly in response to the presence of viscous fluid in said shear space.

* * * * *